United States Patent
May et al.

(10) Patent No.: US 8,943,407 B2
(45) Date of Patent: Jan. 27, 2015

(54) SNOOZE SUPPORT FOR EVENT REMINDERS

(75) Inventors: Darrell May, Waterloo (CA); Andrew D. Bocking, Waterloo (CA); Raymond Vander Veen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 434 days.

(21) Appl. No.: 12/901,000

(22) Filed: Oct. 8, 2010

(65) Prior Publication Data

US 2011/0029870 A1  Feb. 3, 2011

Related U.S. Application Data

(63) Continuation of application No. 11/278,328, filed on Mar. 31, 2006, now Pat. No. 7,836,400.

(51) Int. Cl.
  *G06F 3/00* (2006.01)
  *G06Q 10/10* (2012.01)
(52) U.S. Cl.
  CPC .................................. *G06Q 10/109* (2013.01)
  USPC .......................................... 715/710; 709/206
(58) Field of Classification Search
  USPC .............................. 715/710; 725/135; 709/206
  See application file for complete search history.

(56) References Cited

U.S. PATENT DOCUMENTS

| | | | |
|---|---|---|---|
| 5,442,600 A | 8/1995 | Kutosky | |
| 6,363,352 B1 * | 3/2002 | Dailey et al. | 705/7.19 |
| 6,678,613 B2 * | 1/2004 | Andrews et al. | 701/468 |
| 7,305,441 B2 * | 12/2007 | Mathewson et al. | 709/206 |
| 7,385,875 B2 | 6/2008 | May et al. | |
| 7,484,176 B2 | 1/2009 | Blattner et al. | |
| 7,505,371 B2 * | 3/2009 | May et al. | 368/10 |
| 7,656,275 B2 * | 2/2010 | Marui | 340/309.16 |
| 7,925,525 B2 * | 4/2011 | Chin | 705/7.19 |
| 2003/0018724 A1 * | 1/2003 | Mathewson et al. | 709/206 |
| 2003/0087665 A1 | 5/2003 | Tokkonen | |
| 2004/0061716 A1 * | 4/2004 | Cheung et al. | 345/710 |
| 2004/0216168 A1 | 10/2004 | Trovato et al. | |
| 2006/0036695 A1 | 2/2006 | Rolnik | |
| 2006/0218029 A1 * | 9/2006 | Chin | 705/8 |
| 2007/0112929 A1 | 5/2007 | Etelapera | |
| 2007/0192423 A1 | 8/2007 | Karlson | |
| 2007/0217585 A1 * | 9/2007 | Wollmershauser et al. | 379/201.01 |
| 2008/0034047 A1 | 2/2008 | Rosenberg et al. | |
| 2008/0082651 A1 | 4/2008 | Singh et al. | |
| 2008/0114841 A1 | 5/2008 | Lambert | |
| 2008/0186196 A1 * | 8/2008 | Lessing | 340/686.6 |
| 2008/0259742 A1 | 10/2008 | Tadanori | |

OTHER PUBLICATIONS

Nadarajan, Veeresh—Canadian Intellectual Property Office, "Examiner's Requisition" for Canadian Patent Application No. 2,541,562 dated Jul. 30, 2013.

* cited by examiner

*Primary Examiner* — Amy Ng
*Assistant Examiner* — Meseker Takele
(74) *Attorney, Agent, or Firm* — Ridout & Maybee LLP (57) ABSTRACT

Snooze support for event reminders produced on a hand held mobile device is disclosed. Snooze support in at least one example embodiment is characterized by an event reminder rescheduling method. This event reminder rescheduling method includes the step of prompting for a device user to take one of a number of actions in relation to an event reminder released from an event reminders queue. One of the number of actions is requesting, through operation of one or more input components of the mobile device, that the event reminder be generated again after a lapse of a snooze time.

18 Claims, 5 Drawing Sheets

SNOOZE SUPPORT FOR EVENT REMINDERS

CROSS-REFERENCE TO RELATED APPLICATIONS

The present application is a continuation of U.S. patent application Ser. No. 11/278,328 filed Mar. 31, 2006, and owned in common herewith.

FIELD

The present application relates to event reminders produced on a mobile device and, in particular, to snooze support for those reminders.

BACKGROUND

Communication devices, in particular handheld mobile communication devices, are becoming increasingly sophisticated. A common feature of such communication devices is a system or application for scheduling events and setting reminders such as, for example, a built-in calendar. Sometimes when the reminder is generated at the preset time, the device user will be interrupted from something he was doing such as, for example, carrying out a phone call received or placed on the mobile device. Currently the device user in such a situation may need to read through the reminder or otherwise deal with it before being able to carry on with what he was doing.

Accordingly, it would be advantageous to improve mobile device implemented methods and systems for event reminding.

BRIEF DESCRIPTION OF THE DRAWINGS

Reference will now be made, by way of example, to the accompanying drawings which show example embodiments, and in which.

Similar or the same reference numerals may have been used in different figures to denote similar components.

DESCRIPTION OF EXAMPLE EMBODIMENTS

According to one aspect, there is provided a hand-held mobile electronic device including a controller including at least one processor, for controlling operation of the mobile device; a display coupled to the controller; a user input device coupled to the controller; a storage coupled to the controller, the storage storing event information identifying scheduled events, the event information including for at least some of the scheduled events a reminder time at which an event reminder is to be generated; and a rigid case dimensioned to be held in a hand of a user, the case housing the controller, the display, the user input device and the storage. The controller is configured for: (i) upon or after the reminder time for an event, displaying on the display an event reminder including information about the event and generating on the display a plurality of user selectable options including an option to "snooze" the event reminder for a snooze time duration; and (ii) upon receiving, through the user input device, a selection of the "snooze" option, causing the event reminder to be removed from the display and the causing the event reminder to subsequently be redisplayed on the display after the snooze time duration.

According to another aspect, there is provided an event reminder rescheduling method that includes: providing a hand-held mobile device having a processor, a display, at least one input component and at least one processor readable medium storing an event reminders queue from which event reminders are released at predetermined times; releasing an event reminder from the queue when a first pre-established reminder time has been reached; generating, upon the display and after the event reminder has been released, a Graphical User Interface (GUI) event reminder window that shows particulars of the event reminder; prompting for a device user to take one of a number of actions in relation to the event reminder, one of the actions being requesting, through operation of the input component, that the event reminder be generated again after a lapse of a snooze time; receiving the request that the event reminder be generated again after the lapse of the snooze time; calculating a second reminder time equal to the first reminder time plus the snooze time; repositioning the event reminder in the queue based on the second reminder time; re-releasing the event reminder from the queue when the second reminder time has been reached; and generating, upon the display after the event reminder has been re-released, another GUI event reminder window that redisplays the event reminder particulars.

According to another aspect there is provided a mobile electronic device including a casing configured to be hand held during use of the mobile device; a display housed in the casing; at least one user input component located in the casing; a processor housed in the casing and coupled the display and the user input component; an event reminders thread associated with the processor for releasing and re-releasing an event reminder from a queue when first and second reminder times respectively have been reached; a module associated with the processor for receiving requests initiated through operation of the at least one input component, the module (i) causing generation of first and second Graphical User Interface (GUI) event reminder windows upon the display in response to the release and re-release respectively of the event reminder from the queue, each of the reminder windows showing particulars of the event reminder; and (ii) processing, prior to the re-release of the event reminder, a request that the event reminder be generated again after a lapse of a snooze time, the event reminders thread (i) calculating the second reminder time by adding the snooze time to the first reminder time; and (ii) repositioning the event reminder in the queue based on the second reminder time.

The present description of example embodiments does not limit implementation to any particular computer programming language or system architecture. Embodiments described in the specification are not limited to any particular operating system (OS), mobile device architecture, server architecture, or computer programming language.

Any references herein to "messages" are not intended to be limited to e-mail, but should be understood to include other types of messages that one skilled in the art would understand to be possible in the context in which the term is used. Other types of messages include text messages, audio messages, video messages, and other items. Likewise, the term "event" is used to designate any type of expected event, such as an appointment, a meeting, a conference call, a scheduled task, etc.

Figure 1:
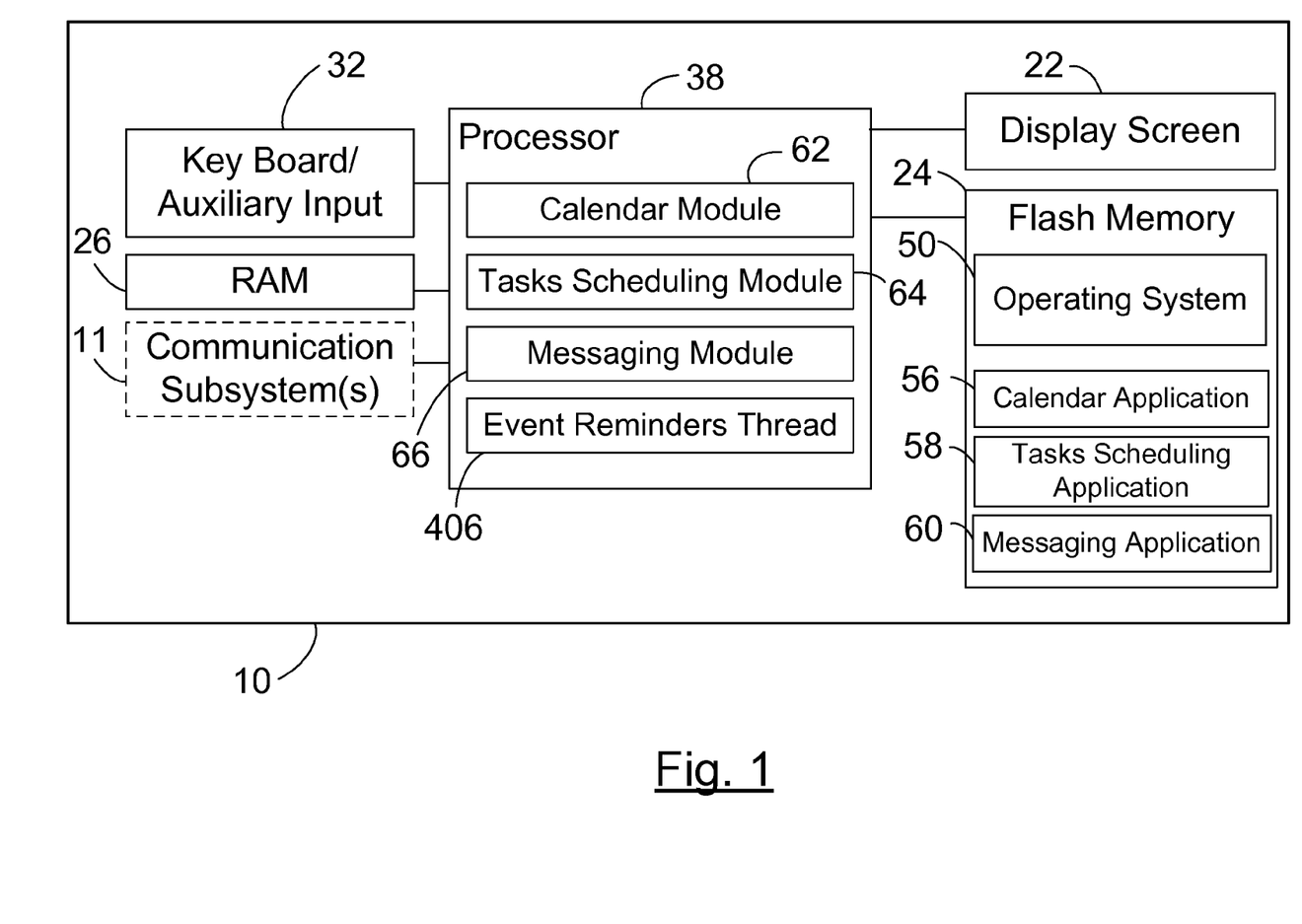
FIG. 1 shows a block diagram of an electronic mobile device to which example embodiments can be applied.

Referring now to the drawings, FIG. 1 is a block diagram of an electronic mobile device 10 to which example embodiments can be applied. The mobile device 10 includes a controller in the form of at least one microprocessor 38 that controls the overall operation of the device. The microprocessor 38 interacts with device subsystems such as a display 22, flash memory 24, random access memory (RAM) 26, communication subsystem(s) 11 (the mobile device 10 may or may not include such a subsystem) and user input components 32 such as a keyboard or keypad and auxiliary on-screen navigation and selection input device(s) such as a touch screen, touch pad, directional button(s), joystick and/or scrollwheel.

Some examples of the mobile device 10 include the wireless communications subsystem(s) 11 for exchanging communications with one or more communications networks including, for example, cellular type wide area wireless networks and/or wireless local area networks. In some examples, the mobile device 10 is a two-way, electronic communications device having data and possibly also voice communication capabilities. In some examples, the mobile device 10 has the capability to exchange messages with other devices and computer systems on the Internet. Depending on the functionality provided by the mobile device 10, in various examples the mobile device may be a multiple-mode communication device configured for both data and voice communications, a smartphone, a Personal Digital Assistant (PDA), or a mobile computer system among other things. In some examples, the mobile device 10 is not a wireless communications device. For example, there exist PDAs that are not capable of sending and receiving wireless communications.

Operating system software 50 and various software applications (for example, calendar application 56, tasks scheduling application 58 and messaging application 60) used by the microprocessor 38 are, in a number of example embodiments, stored in a persistent store such as the flash memory 24 or similar storage element. Those skilled in the art will appreciate that the operating system 50, other software applications, or parts thereof, may be temporarily loaded into a volatile store such as the RAM 26.

The microprocessor 38, in addition to its operating system functions, can enable execution of software applications (for example, the calendar application 56, the tasks scheduling application 58 and the messaging application 60) on the mobile device 10. A predetermined set of software applications which control basic device operations, including data and voice communication applications for example, will normally be installed on the mobile device 10. In some embodiments, the processor 38 is configured to implement a number of modules for interacting with the various device subsystems described above (or other device subsystems). In some embodiments, some or part of the functionality of a number of these modules can be implemented through firmware or hardware components instead of, or in combination with, computer software instructions executed by the microprocessor 38 (or other processors).

As a first module example, under instructions from the calendar application 56 resident on the mobile device 10, the processor 38 could be configured to implement calendar module 62. The calendar module 62 facilitates device user scheduling and reminding in relation to appointments, meetings and the like. In some examples, the calendar module 62 handles meeting invitations sent and received over a communication network, through the communication subsystem 11.

As a second module example, under instruction from the tasks scheduling application 58 resident on the mobile device 10, the processor 38 could be configured to implement tasks scheduling module 64. The tasks scheduling module 64 facilitates device user scheduling and reminding in relation to tasks. Tasks that the device user schedules will normally be something other than an appointment or a meeting. For instance, examples of task events include scheduled moments in a day when medication needs to be taken, or scheduled moments in a day when household chores such as watering plants need to be done. Of course other tasks are also contemplated. In some examples, the tasks scheduling module 64 permits scheduling of recurrent tasks.

As a third module example, under instruction from the messaging application 60 resident on the mobile device 10, the processor 38 could be configured to implement messaging module 66. The messaging module 66 enables composition of data items, such as e-mail messages for example. Such composed items may then be transmitted over a communication network through the communication subsystem 11. Conversely, messages can be received through the communication subsystem 11 for processing by the messaging module 66. The calendar application 56, the tasks scheduling application 58 and/or the messaging application 60, may, in at least some embodiments, be sub-applications that are part of a personal information module (PIM) application.

Figure 2:
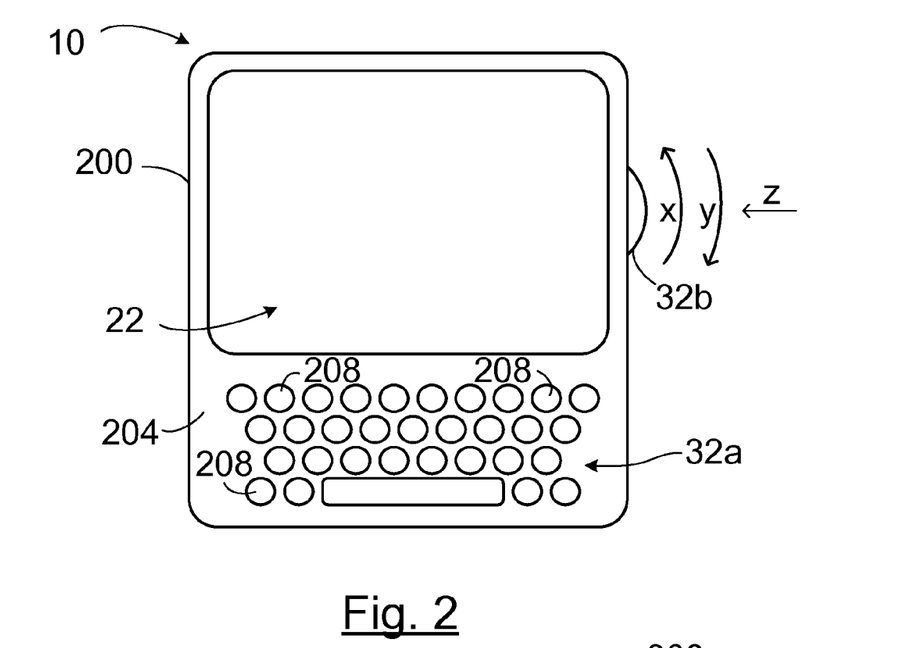
FIG. 2 is a front or plan view, in diagrammatic form, of an example of the device of FIG. 1.

With reference now to FIG. 2, in some examples, the components and subsystems of mobile device 10 are housed within a rigid case 200 that is configured to be held with one or two hands while the mobile device 10 is in use. The mobile device 10 is, in some examples, small enough to fit inside a standard purse or coat pocket. In the illustrated embodiment, alphanumeric keyboard or keypad 32a is horizontally positioned symmetrically between a left edge and a right edge of a face 204 of the mobile device 10. The keyboard 32a includes several keys 208 for user input of displayable numbers, letters or other characters. In some embodiments, the case of the device may include two parts that are pivotally or slidably movable relative to each other between open and shut positions.

In some examples, the keys 208 of the keyboard 32a consist of number, pound and asterisk keys typically found on any telephone, plus a few additional keys associated with miscellaneous inputs (for example, a hang up or answer call key); however in examples such as the illustrated example, the keyboard 32a has a larger number of keys. In the illustrated example, the keyboard 32a mimics standard full-sized keyboards normally associated with personal computers (e.g. a number of the keys 208 could each permit input of a particular letter of the alphabet). The illustrated keyboard 32a also includes one or more special keys that can be held down to give an alternate meaning to other keys/components when depressed. In at least one example, these one or more special keys include an Alt key. As will be appreciated by those skilled in the art, keys that give alternate meaning to other input components enable expanded input capability such as, for example, the ability to provide for so-called "shortcut keys".

The illustrated mobile device 10 also includes a user depressible and rotatable input mechanism such as scrollwheel 32b that can be rotated upwards towards an upper end of the device or downwards towards a bottom end of the device, as indicated by the arrows x and y respectively. Rotation is about an axis perpendicular to the face 204 of the mobile device 10. In the illustrated example, the scrollwheel 32b protrudes through an opening that is provided through a side of the housing case 200 so as to be adapted for manipulation by a thumb (or other hand digit) of a user of the mobile device 10. In addition to being rotatable, the illustrated scrollwheel 32b can also be depressed inwardly as indicated by arrow z.

Figure 3:
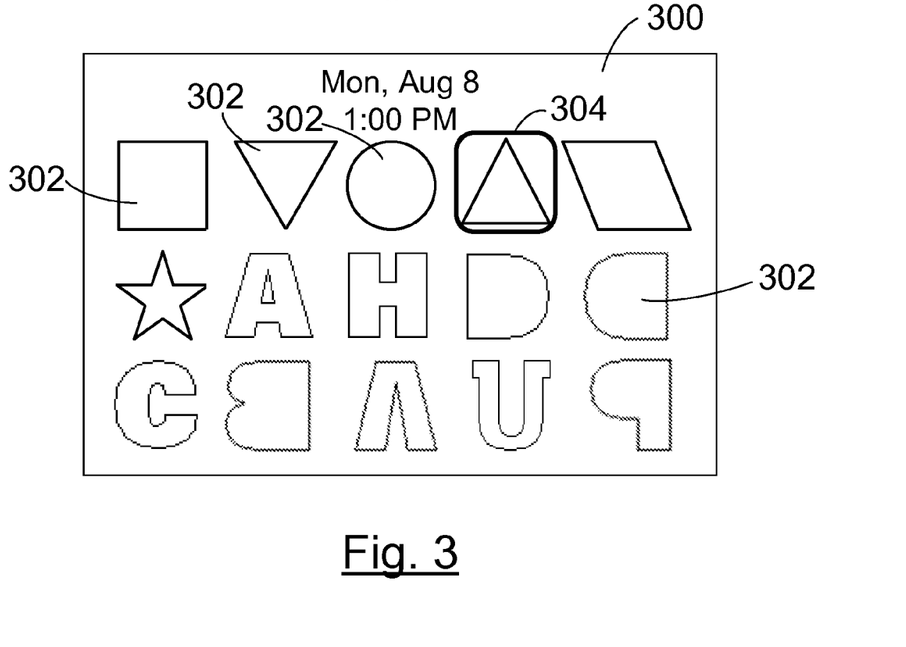
FIG. 3 shows, in diagrammatic form, an example user interface screen of an operating system within which a user of the device shown in FIG. 1 can request that an application be run.

Having discussed examples of possible physical input components of the mobile device 10, a number of example user interface screens of the mobile device 10 are now described in order that details of example embodiments may be expounded upon. Beginning with reference to FIG. 3, example user interface screen 300 is generated by the operating system 50 to provide the device user with choices of applications that can be run. In the illustrated example, various applications each have an associated selectable icon 302. For instance, one of the icons 302 might be associated with the calendar application 56, another of the icons 302 might be associated with the tasks scheduling application 58, and yet another of the icons 302 might be associated with the messaging application 60. In at least one example, the device user can rotate the scrollwheel 32b in either direction x or y, causing an on-screen position marker or selection symbol 304 to move through the icons 302 until it is positioned on the icon 302 associated with the application that the device user wants to launch. The device user can then depress the scrollwheel 32b in direction z. This input action is translated by the operating system 50 into a request for the application associated with the selected icon to be launched. In at least one example, one or more alternative input components can be operated to carry out the same application launch request, for instance, pressing of a combination of arrow keys and an Enter key or pressing one or more shortcut keys.

Once the operating system 50 launches the appropriate application, the user interface screen 300 may be replaced by whatever startup interface screen is generated by the launched application. The device user would then typically proceed through further user interface screens of the application that was launched. For example, if the device user launches the calendar application 56, the device user may need to navigate through a number of user interface screens in order to enter the details of (and set) various calendar event reminders. As another example, if the device user launches the tasks scheduling application 58, the device user may need to navigate through a number of user interface screens in order to enter the details of (and set) various task event reminders. example Event reminder details can be stored in persistent storage 24 and/or volatile storage 26 on the mobile device 10 and will vary depending upon the type of event reminder that is being set. Possible details for a calendar event reminder may include, for example, a short meeting/appointment subject description, meeting/appointment location, event start time, event end time, number of minutes prior to the start time that the reminder is to be generated, meeting/appointment description, etc. Possible details for a task event reminder include, for example, a short subject description of the task, the due date for the task, the start date of the task, status of the task, priority of the task, percentage of the task that has been completed, date and time the task reminder is to be initiated, the description of the task, etc. Thus event reminder details may vary significantly depending upon the type of event reminder that the device user creates; however in at least one example embodiment any event reminder that is set will be positioned into a generic event reminders queue managed by event reminders thread 406 (FIG. 1) and positioning in this queue will be based on the time at which the event reminder is to be generated.

In some example embodiments, the event reminders thread 406, which is a thread of the operating system 50, receives and releases event reminders from an event reminders queue stored on, for example, the flash memory 24 and/or the RAM 26. When an event reminder is set in, for example, the calendar application 56 or the tasks scheduling application 58, the event reminder is positioned in the event reminders queue for release at a later, pre-established reminder time (this time is typically chosen by the device user at the time of event reminder details entry). It will be understood that the queue position given to the event reminder will depend upon the time at which the event reminder is to be released from the queue relative to other event reminders in the queue. In particular, one event reminder will be ahead of another event reminder in the queue if that event reminder is to be released sooner in time than the other event reminder.

In some example embodiments, after each event reminder is released from the event reminders queue, a corresponding GUI event reminder window is generated in response to the release of that event reminder from the event reminders queue. The typical purpose of the reminder window is of course to remind the device user, by way of a visual alert, that there is an upcoming event. It will be understood that this visual alert will possibly be complimented by an audible and/or vibrational alert.

In accordance with at least one example embodiment, the generated reminder window presents the device user with a number of selectable options, at least one of which is to "snooze" the reminder for a number of minutes, hours or days. (An analogy may be drawn between snoozing of an event reminder and snoozing of a "rise and shine" alarm generated by an alarm clock, in that by snoozing an event reminder, the device user stops the reminder from being displayed, but only temporarily in that the reminder is going to be displayed again at a later point in time.) If the device user chooses to have the event reminder generated again after a lapse of the snooze time, the mobile device 10 processes this request and, in response to the request, the event reminders thread 406 takes action to fulfill the request. Such action can include, for example, calculating the second reminder time, which is the first reminder time plus the snooze time, and repositioning the event reminder in the event reminders queue based on the second reminder time.

Figure 4:
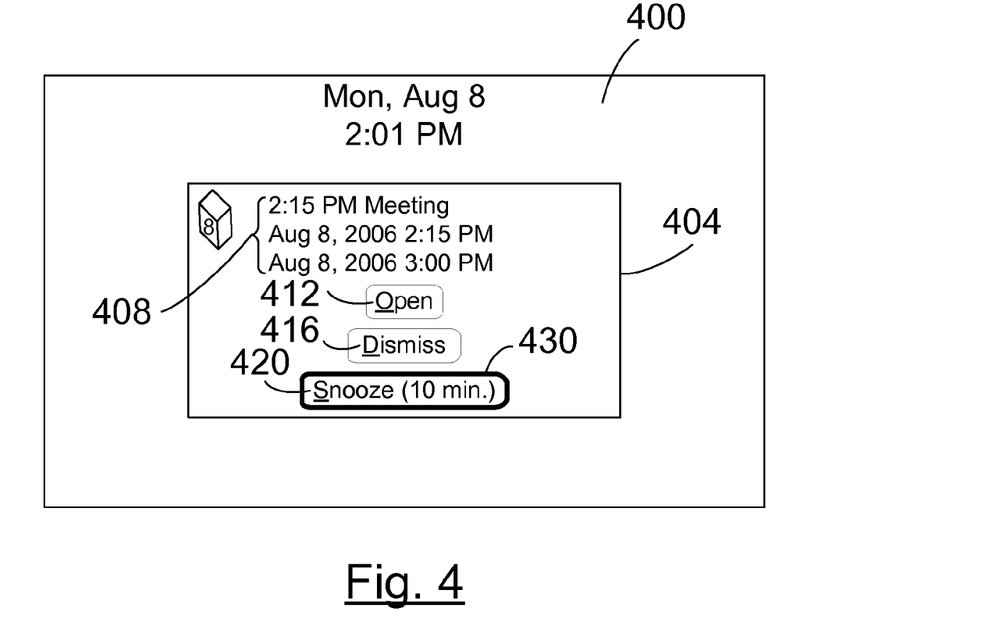
FIG. 4 shows, in diagrammatic form, an example calendar event reminder window in the foreground of a user interface screen.

To facilitate an understanding of a selectable snooze option in accordance with example embodiments, example event reminder windows shown in FIGS. 4-7 will presently be described. Turning now to FIG. 4, this figure shows an example user interface screen 400 that includes a calendar event dialog window 404 that is in the foreground of the screen 400. It will be understood that the dialog window 404 of the illustrated example was generated in response to the release of a calendar event reminder from an event reminders queue maintained by the event reminders thread 406 that has been described previously in this disclosure. The dialog window 404 shows particulars 408 of the calendar event reminder, which includes a number of the possible details for calendar event reminders that were described previously in this disclosure. It is contemplated that the displayed particulars could include more or fewer details than those of the illustrated particulars 408. One skilled in the art will appreciate that while the event reminders thread 406 can initiate generation of the dialog window 404, in some implementations, the reminders thread 406 may not be able to obtain the particulars 408 independently, but instead obtains them through interaction with the calendar application 56.

The dialog window 404 also presents the device user with three selectable options 412, 416 and 420, which are "Open", "Dismiss" and "Snooze (10 min.)". In at least one example, the device user can, in response to being prompted to take action, rotate the scrollwheel 32b in either direction x or y, causing selection symbol 430 to move through the options 412, 416 and 420 until it is positioned on the option intended to be selected. (Navigation through the selectable options by means of some other input component(s) such as, for example, arrow keys or a Tab key is also contemplated.)

Figure 5:
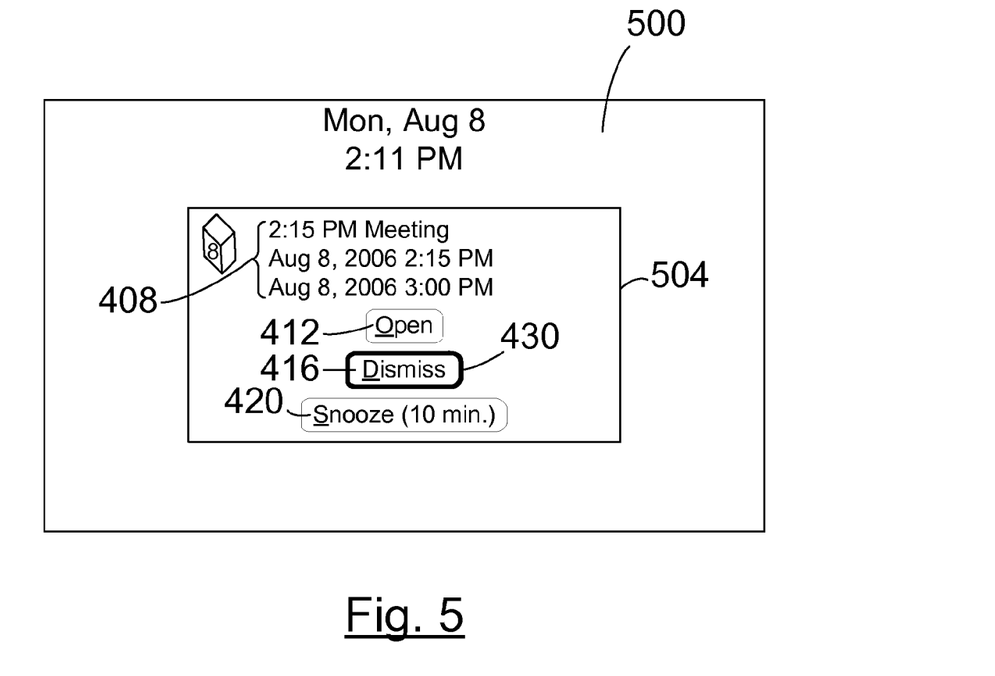
FIG. 5 shows, in diagrammatic form, an example reminder window similar to the reminder window shown in FIG. 4, but displayed at a point in time after a lapse of a snooze time.

In the illustrated example, the device user has navigated the selection symbol 430 onto the option 420, and by so doing the device user can snooze the calendar event reminder simply by, for example, depressing the scrollwheel 32b or depressing the Enter key on the keyboard 32a. Once this is done, the dialog window 404 will be cleared from the screen 400; however the event reminder has been rescheduled rather than dismissed, so ten minutes later when the calendar event reminder is re-released from the event reminders queue maintained by the event reminders thread 406, another dialog window 504 will appear in response as shown in FIG. 5.

As was the case for the dialog window 404, the dialog window 504 is in the foreground of user interface screen 500. Also like the dialog window 404, the dialog window 504 shows the particulars 408 of the calendar event reminder; however it is contemplated that the particulars need not be exactly the same as those shown previously. For example, in addition to the three redisplayed lines there could be an additional line stating "already snoozed once".

The dialog window 504 also presents the device user with the three selectable options 412, 416 and 420. At the present point in the illustrated scenario, the device user could navigate the selection symbol 430 over the selectable option 416 as illustrated to dismiss the event reminder, which would mean that the device user does not need to be reminded again about his 2:15 PM meeting. Alternatively, the device user could again snooze the calendar event reminder; however if he snoozed the event reminder for 10 minutes the next reminding dialog window would of course not be generated until after the scheduled start of his 2:15 PM meeting. In some embodiments, when a dialog window is generated, the selection symbol 430 is by default positioned at the "Snooze" option 420, so that the device user only has to depress the scrollwheel (or press another predetermined selection key) in order to initiate the snooze function. In other embodiments, the selection symbol 430 is positioned at the "Dismiss" option by default when the dialog window 404 is generated.

Figure 6:
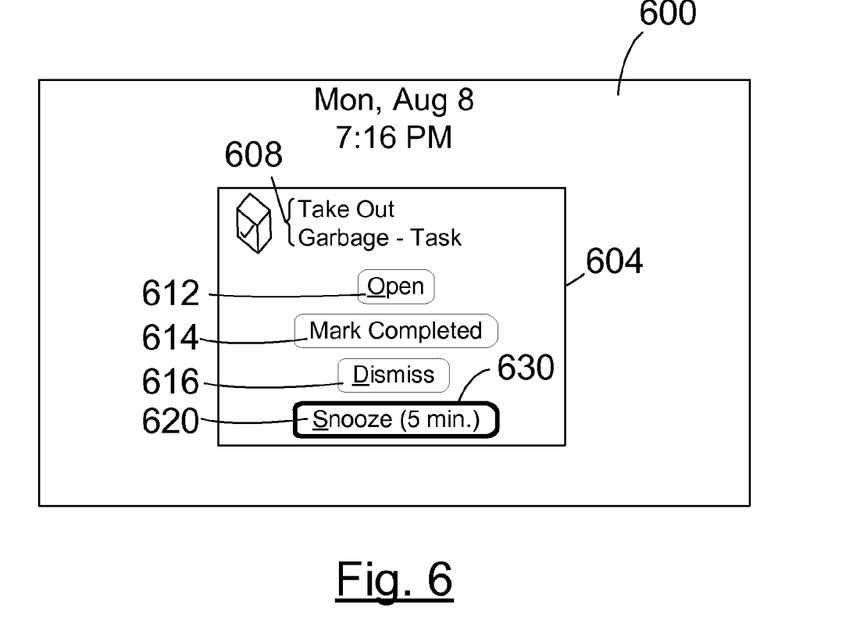
FIG. 6 shows, in diagrammatic form, an example task event reminder window in the foreground of a user interface screen.

Turning now to FIGS. 6 and 7, these again illustrate the above described selectable snooze option, but applied to a task event reminder rather than a calendar event reminder. Referring to FIG. 6, an example of a user interface screen 600 is illustrated. The screen 600 includes a task event dialog window 604 that is in the foreground of the screen 600. It will be understood that the dialog window 604 of this illustrated example was generated in response to the release of a task event reminder from an event reminders queue managed by the event reminders thread 406. The dialog window 604 shows particulars 608 of the task event reminder, which includes some of the possible details for task event reminders that were described previously in the disclosure. It is contemplated that the displayed particulars could include more or fewer details than those of the illustrated particulars 608. One skilled in the art will appreciate that while the event reminders thread 406 can initiate generation of the dialog window 604, in some implementations, event reminders thread 406 may not be able to obtain the particulars 608 independently, but instead obtains them through interaction with the tasks scheduling application 58.

The dialog window also presents the device user with four selectable options 612, 614, 616 and 620, which are "Open", "Mark Completed", "Dismiss" and "Snooze (5 min.)". In at least one example, the device user can, in response to being prompted to take action, rotate the scrollwheel 32b in either direction x or y, causing selection symbol 630 to move through the options 612, 614, 616 and 620 until it is positioned on the option intended to be selected. (Navigation through the selectable options by means of some other input component(s) such as, for example, arrow keys or a Tab key is also contemplated.)

Figure 7:
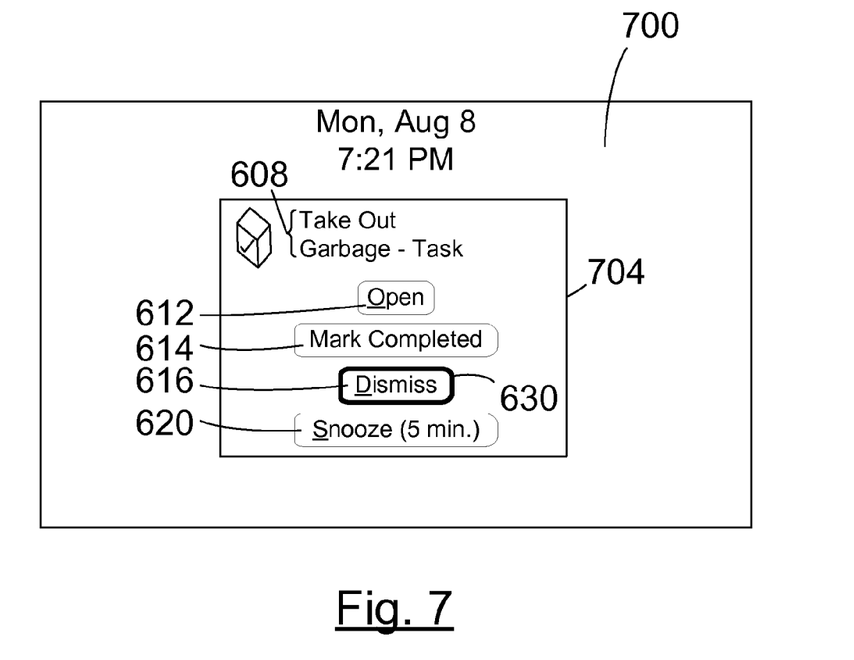
FIG. 7 shows, in diagrammatic form, an example reminder window similar to the one shown in FIG. 6, but displayed at a point in time after a lapse of a snooze time.

In the illustrated example, the device user has navigated the selection symbol 630 onto the option 620, and by doing so the device user can snooze the task event reminder simply by, for example, depressing the scrollwheel 32b or depressing the Enter key on the keyboard 32a. Once this is done, the dialog window 604 will be cleared from the screen 600; however the event reminder has been rescheduled rather than dismissed, so five minutes later when the task event reminder is re-released from the event reminders queue maintained by the event reminders thread 406, another dialog window 704 will appear in response as shown in FIG. 7.

As was the case for the dialog window 604, the dialog window 704 is in the foreground of user interface screen 700. Also like the dialog window 604, the dialog window 704 shows the particulars 608 of the task event reminder; however it is contemplated that the particulars need not be exactly the same as those shown previously. For example, in addition to the words "take out garbage—task", additional words such as "already snoozed once" could be included in the particulars shown in the dialog window 704.

The dialog window 704 also presents the device user with the four selectable options 612, 614, 616 and 620. At the present point in the illustrated scenario, the device user could navigate the selection symbol 630 over the selectable option 616 as illustrated to dismiss the task reminder, which would mean that the device user does not need to be reminded again about the need to take out the garbage. Alternatively, the device user could navigate the selection symbol 630 over the selectable option 614 to mark the task as having been completed, which would have the effect of clearing the dialog window 704, but would also have the effect of recording in the data store of the mobile device 10 that the task of taking out the garbage has been completed. As yet another alternative, the device user could again snooze the task event reminder by navigating the selection symbol 630 over the selectable option 620 and then selecting it by, for example, depressing the scrollwheel 32b or depressing the Enter key on the keyboard 32a.

Figure 8:
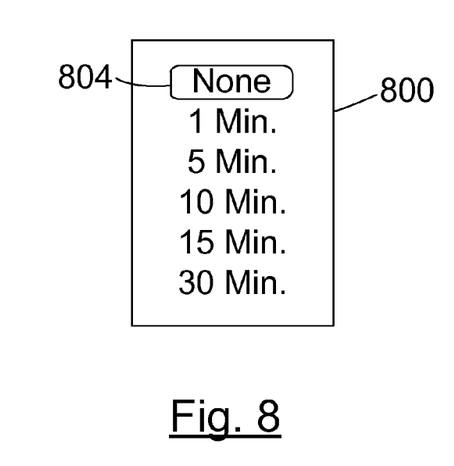
FIG. 8 shows, in diagrammatic form, an example selection list providing a plurality of selectable snooze times.

In some examples, the snooze time duration for the selectable snooze option is configurable from within a settings or options screen of the calendar application 56, the tasks scheduling application 58 and/or the messaging application 60. FIG. 8 shows an example selection list 800 that might be generated within such an options screen. Selection symbol 804 is provided for navigating through the example snooze times that can be chosen, namely 1 minute, 5 minutes, 10 minutes, 15 minutes and 30 minutes.

Figure 9:
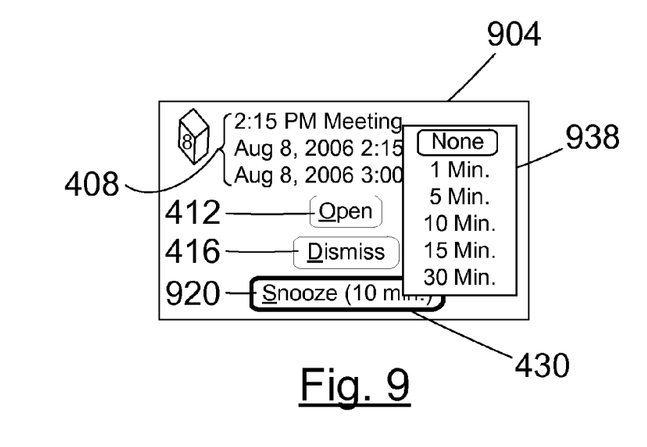
FIG. 9 shows, in diagrammatic form, an alternative example calendar event reminder window.
Figure 10:
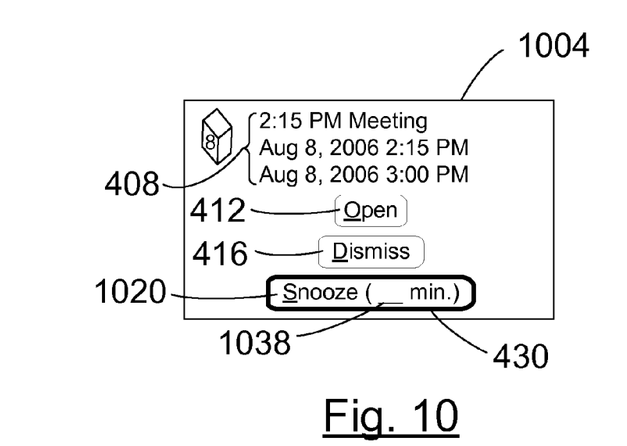
FIG. 10 shows, in diagrammatic form, yet another alternative example calendar event reminder window.

In other examples, the snooze time duration can be set at the time of alert and from within the GUI event reminder window. FIGS. 9 and 10 illustrate two such examples. Referring to FIG. 9, calendar event reminder window 904 is similar to the event reminder window shown in FIG. 4; however in addition to the device user being able to choose selectable snooze option 920 to snooze the calendar event reminder for a default amount of 10 minutes, the device user can also press some special meaning key(s) or a special meaning key and scroll combination such as, for example, holding down the Alt key while rotating the scrollwheel 32b while the selection symbol 430 is positioned at snooze option 920, to make example selection list 938 appear so that some other snooze time duration listed within the selection list 938 can be chosen. In some embodiments, in place of a selection list 938, different time options will appear in place of "(10 min)" within the displayed snooze option 920 as the user presses the Alt key while rotating the scrollwheel 32b when the selection symbol 430 is positioned at snooze option 920—so for example rotating the scroll wheel in direction y will cause the phrase "Snooze (10 min)" to be replaced by "Snooze (15 min)" in the displayed snooze option 920, and continued rotation in direction y will then cause "Snooze (15 min)" to be replaced with "Snooze (30 min)" and then "Snooze (1 min)" and so on. The user can then select snooze for the displayed time duration by pressing the scrollwheel (or other predetermined input key)

Other GUI event reminder windows permitting the snooze time duration to be set at the time of alert are contemplated, and one such alternative event reminder window 1004 is shown in FIG. 10. Here, once the device user has navigated the selection symbol 430 over selectable option 1020, the device user can operate the keyboard 32a to type in the desired snooze time duration. This snooze time duration will appear within the area where the option 1020 is displayed and, more specifically, it will appear at cursor 1038.

It will be understood that while the event reminders thread 406 and the event reminders queue that it manages have herein been described as being generic, in some examples, the event reminders thread could be non-generic. For instance, there could be one or more event reminders thread and one or more event reminders queue for each of the calendar application and the tasks scheduling application.

It will also be understood that the calendar application 56 and the tasks scheduling application 58 need not be distinct applications launchable by way of their respective icon 302 within the screen 300 (FIG. 3) of the operating system 50: the calendar application 56 and/or the tasks scheduling application 58 could, for example, be an integrated component of the messaging application 60. In at least another alternative example, the calendar application 56 is a distinct application launchable from within the screen 300 with a subsidiary component of the calendar application 56 handling task scheduling.

Certain adaptations and modifications of the described embodiments can be made. Therefore, the above discussed embodiments are considered to be illustrative and not restrictive.

What is claimed is:
1. A mobile electronic device comprising:
   a processor for controlling operation of the mobile device;
   a touch sensitive display coupled to the processor; and
   a storage coupled to the processor, the storage storing event information identifying scheduled events, the event information including, for at least one of the scheduled events, a reminder time at which an event reminder is to be generated;
   the processor being configured for:
   (i) displaying on the display, at the reminder time, a first user interface providing the event reminder that includes information about the event and that includes a count of how many times that a snooze button has been selected for the event reminder, the first user interface also providing a plurality of selectable buttons including the snooze button;
   (ii) receiving, from the touch sensitive display after the displaying, a first input indicating selection of the snooze button;
   (iii) presenting on the display, after receipt of the first input, a second user interface providing a menu that lists a plurality of selectable snooze time durations;
   (iv) receiving, from the touch sensitive display after the presenting of the second user interface, a second input indicating selection of one selected snooze time duration from the plurality;
   (v) in response to receipt of the second input, removing the first and second user interfaces from the display and increasing by one the count of how many times that the snooze button has been selected for the event reminder;
   (vi) designating expiration of the selected snooze time duration as a new reminder time; and
   (vii) updating the event information with the new reminder time at which the first user interface is to be redisplayed and with the increased count.

2. The mobile electronic device of claim 1 wherein the plurality of selectable buttons provided by the first user interface further includes a dismiss event reminder button.

3. The mobile electronic device of claim 2, wherein displaying the first user interface further comprises automatically displaying a selection symbol positioned over the dismiss event reminder button.

4. The mobile electronic device of claim 1 wherein the plurality of selectable buttons provided by the first user interface includes an open event reminder button.

5. The mobile electronic device of claim 1 wherein the scheduled events include calendar events and task events.

6. The mobile electronic device of claim 1 wherein the storage further stores a default snooze time duration and wherein a selection focus is automatically positioned over the default snooze time duration in the second user interface.

7. The mobile electronic device of claim 1, wherein the plurality of user selectable snooze time durations are displayed on an area of the display which was occupied, at least in part, by the snooze button, thereby obscuring at least part of the snooze button.

8. The mobile electronic device of claim 1, wherein the mobile electronic device further comprises:
   a keyboard coupled to the processor,
   and wherein the processor is further configured for:
      upon or after displaying the first user interface, accepting input from the keyboard setting the selected snooze time duration.

9. The device as claimed in claim 1 wherein the processor is further configured for:
   repeating (i) to (vii) as long as selection of the snooze button is received at (ii).

10. An event reminder rescheduling method performed by a mobile device having a processor, a touch sensitive display, and at least one processor readable medium storing an event reminders queue from which event reminders are released at predetermined times according to queue order, event reminders being positioned in the event reminders queue based on respective times at which event reminders are to be generated, the method comprising:
(i) releasing an event reminder from the queue when a first pre-established reminder time has been reached;
(ii) displaying, on the touch sensitive display after the event reminder has been released, a Graphical User Interface (GUI) event reminder window, the GUI event reminder window including a plurality of selectable options including an option indicating that the GUI event reminder window be redisplayed on the touch sensitive display after a lapse of a snooze time duration, the GUI event reminder window also including a display of a count of how many times the option indicating that the GUI event reminder window be redisplayed has been selected for the event reminder;
(iii) receiving, from the touch screen display after displaying the GUI event reminder window, a first input selecting the option indicating that the GUI event reminder window be redisplayed;
(iv) displaying on the touch screen display, after receiving the first input indicating that the GUI event reminder window be redisplayed, a pop-up menu listing a plurality of selectable snooze time durations;
(v) receiving a second input from the touch sensitive display indicating a selection of one of the selectable snooze time durations;
(vi) upon receipt of the second input, calculating a second reminder time based on the selected snooze time duration and increasing by one the count of how many times the option indicating that the GUI event reminder window be redisplayed has been selected for the event reminder; and
(vii) repositioning the event reminder in the event reminder queue according to the second reminder time.

11. The method as claimed in claim 10 further comprising displaying an options menu on the display for a scheduling application, wherein the snooze time duration is configurable from within the options menu.

12. The method as claimed in claim 10 further comprising generating audible sound concurrently when displaying the GUI event reminder window and when redisplaying the GUI event reminder window.

13. The method of claim 10, wherein plurality of selectable options includes an option for dismissing the GUI event reminder window.

14. The method of claim 10, wherein the plurality of selectable options includes an option to view an event associated with the event reminder.

15. The method of claim 10, wherein the plurality of selectable snooze time durations are displayed in a portion of the display which was occupied, at least in part, by the GUI event reminder window.

16. An electronic device comprising:

a touch sensitive display;

a processor coupled to the touch sensitive display;

an event reminders thread associated with the processor for releasing event reminders from a queue according to queue order, event reminders being positioned in the queue based on when respective reminder times have been reached;

the processor being configured to implement a module for receiving from the touch sensitive display, the module causing the device to:

(i) display a Graphical User Interface (GUI) event reminder window on the touch sensitive display in response to the release of an event reminder from the queue at a first reminder time, the GUI event reminder window including a plurality of selectable options including an option indicating that the GUI event reminder window be redisplayed on the touch sensitive display after a lapse of a snooze time duration, the GUI event reminder window also including a count of how many times the option indicating that the GUI event reminder window be redisplayed has been selected for the event reminder;

(ii) receive, from the touch screen display after displaying the GUI event reminder window, a first input selecting the option indicating that the GUI event reminder window be redisplayed;

(iii) display on the touch screen display, after receiving the first input indicating that the GUI event reminder window be redisplayed, a pop-up menu listing a plurality of selectable snooze time durations;

(iv) receive a second input from the touch sensitive display indicating a selection of one of the plurality of selectable snooze time durations; and (v) after receiving the second input, processing the second input indicating a selection of one of the snooze time durations, wherein the processing comprises calculating a second reminder time based on the selected snooze time duration, increasing by one the count of how many times the option indicating that the GUI event reminder window be redisplayed has been selected for the event reminder, and repositioning the event reminder in the queue based on the second reminder time.

17. The device as claimed in claim 16 wherein the plurality of selectable snooze time durations includes: 1 minute, 5 minutes, 10 minutes, 15 minutes and 30 minutes.

18. The device as claimed in claim 16 wherein the GUI event reminder window includes an option to directly modify the snooze time duration using keyboard input.

* * * * *